Nov. 15, 1927.
J. P. SHAMBERGER
1,649,134
TRUCK
Filed June 13, 1924 4 Sheets-Sheet 3
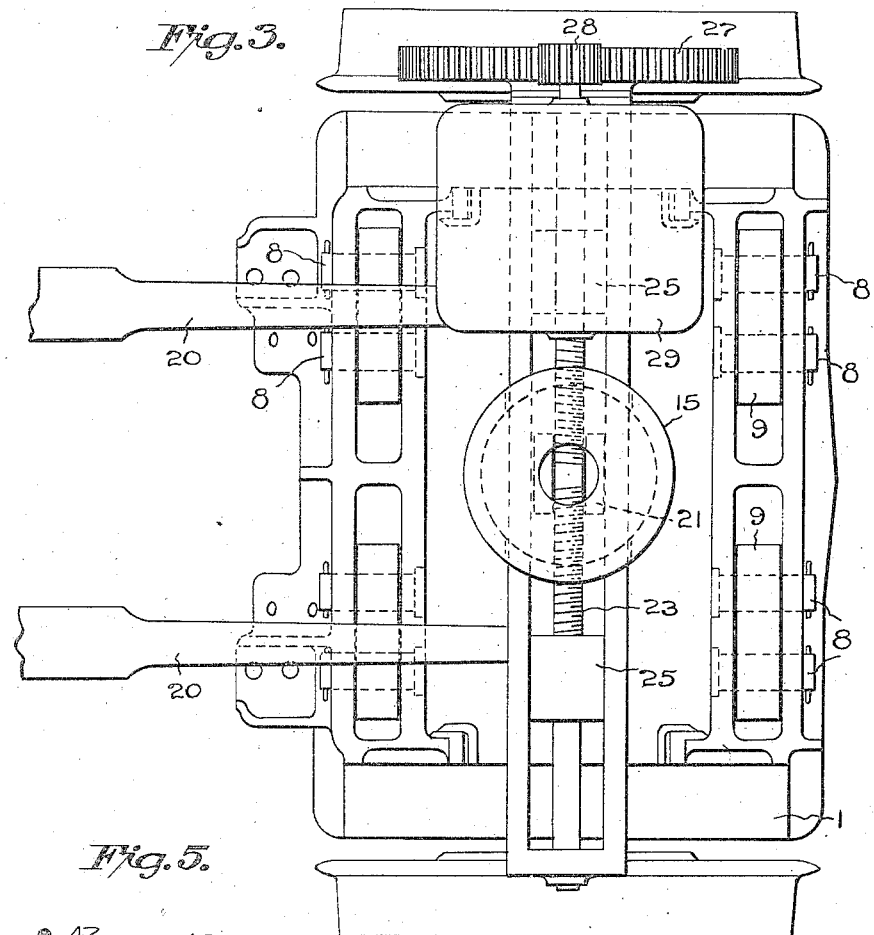
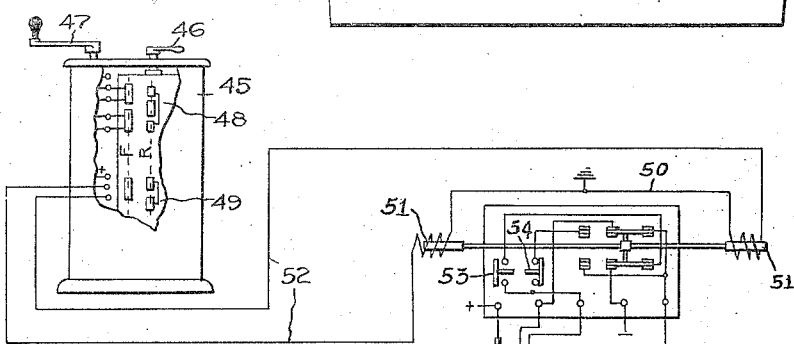
WITNESSES:
R. J. Harrison
W. B. Jaspert.
INVENTOR
John Paul Shamberger
BY
Wesley G. Carr
ATTORNEY

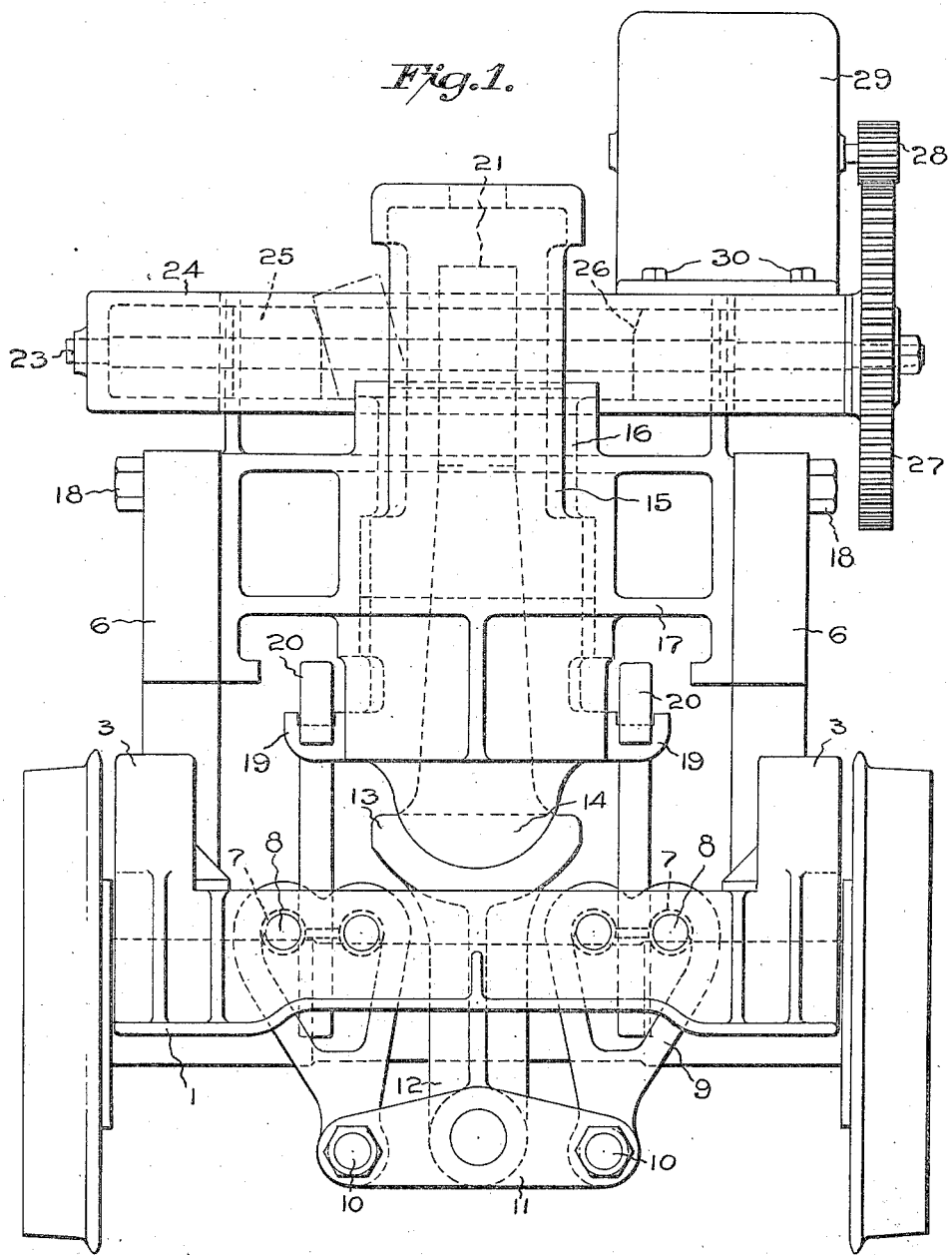

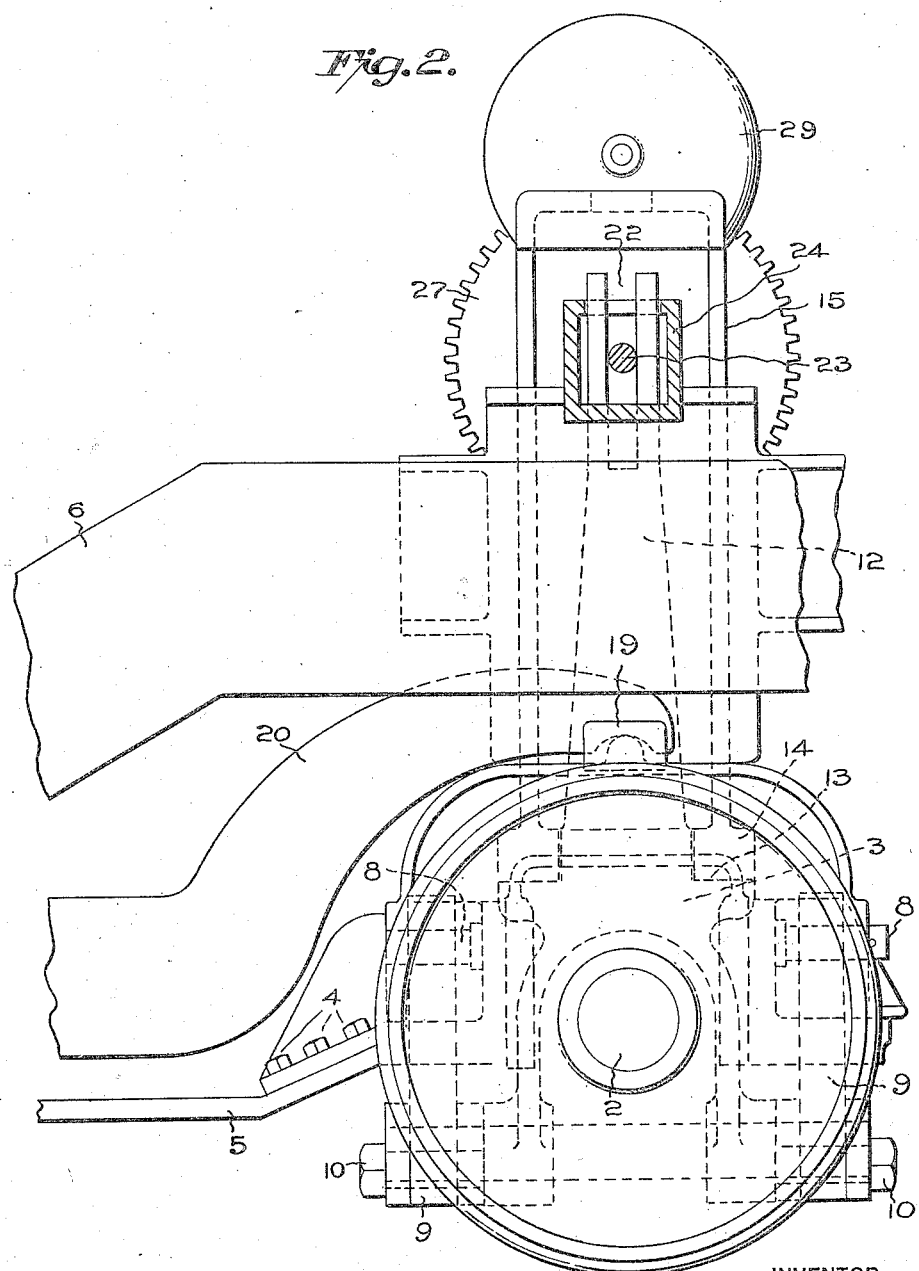

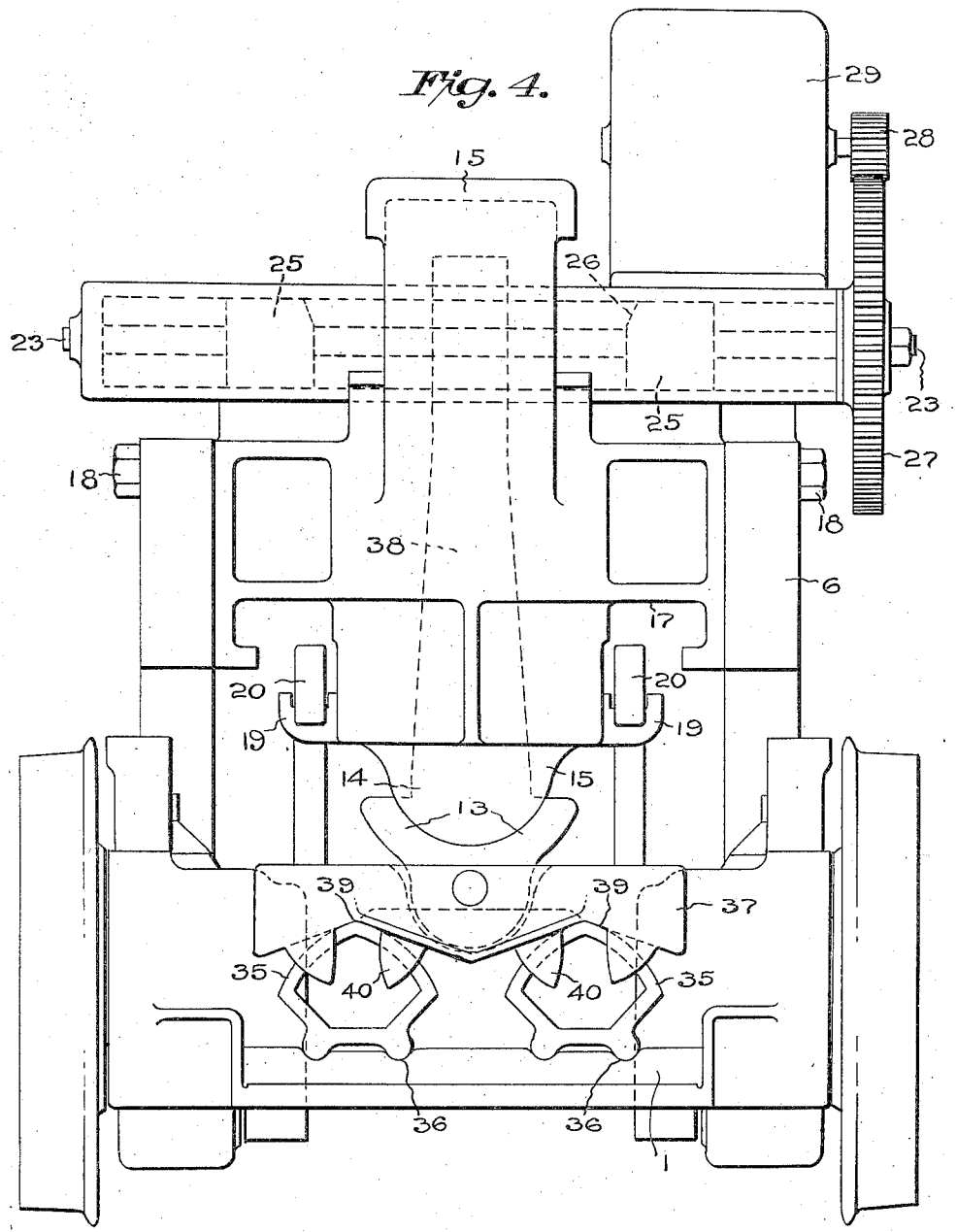

Patented Nov. 15, 1927.

1,649,134

UNITED STATES PATENT OFFICE.

JOHN PAUL SHAMBERGER, OF WILKINSBURG, PENNSYLVANIA, ASSIGNOR TO WESTINGHOUSE ELECTRIC & MANUFACTURING COMPANY, A CORPORATION OF PENNSYLVANIA.

TRUCK.

Application filed June 13, 1924. Serial No. 719,737.

My invention relates to guiding mechanisms for railway vehicles, more particularly to guiding trucks that are adapted to effect steering action of the vehicle with respect to the rails.

It is among the objects of my invention to provide a guide truck having an automatic or semi-automatic steering device which shall be effective in positively steering the vehicle supported thereon relative to the curvature of the rail.

It is a further object of my invention to provide a guide mechanism of the above-designated character which shall be of simple, compact and durable mechanical construction and which shall be adapted to standard railway vehicles.

It is still a further object of my invention to provide a guiding or steering truck for railway vehicles which shall be positively restrained, which shall be actuated by electrical operating means that is controllable by the operator, and which will guide positively when the truck is in either a leading or a trailing position.

Various types of guiding trucks have been proposed for effecting smooth and free operation of the vehicle on the rails for different service requirements, which vary in accordance with the curvature and irregularities of the road bed. The most successful types are of the swinging bolster or rocker type trucks, having a center pin connection with the vehicle frame and a radius bar pivoted or otherwise secured to the underside of the vehicle frame member. The bolster member is supported or suspended from the truck frame by compression or tension links of the cam type, and the steering action is provided by various actuating means that are either mechanically or pneumatically operated.

My present invention is directed to a guiding truck having a rocker or swing bolster suspended or supported on the truck frame, with a center-pin connection to the vehicle frame and a positive actuating means for effecting the proper steering of the guide truck so that the truck member will guide positively when leading and positively when trailing.

I propose to utilize a swing bolster construction in which the bolster member has a vertically extending body portion, which is adapted to engage a screw-and-nut mechanism that is actuated by an electrical motor or other suitable drive means. My guide truck further embodies novel features of construction which increases the efficiency of this type of truck over the types heretofore proposed, and my design is further susceptible of simplified construction of the operating parts, which eliminates the possibilities of breakage.

In the accompanying drawings constituting a part hereof and in which like reference characters designate like parts, Figure 1 is a view in end elevation of a guide truck and a portion of the vehicle frame, embodying the principles of my invention.

Fig. 2 is a view in side elevation (partially in cross section) thereof,

Fig. 3 is a top plan view of the guide truck shown in Figs. 1 and 2,

Fig. 4 is a view in end elevation of a guide truck embodying a modified type of bolster construction and means for effecting swinging engagement of the bolster with the supporting truck, and Fig. 5 is a diagrammatic view of a reversing controller for the drive motors connected to the motor of the actuating mechanism for operating the steering device.

Referring to the drawings, the structure therein illustrated comprises a truck frame 1 that is journalled on a wheel axle, Fig. 2, in the usual manner, as by a plurality of journal boxes 3. The frame member 1 is secured by bolts 4 to a radius bar 5, which is connected to the under side of the vehicle frame 6.

The truck frame 1 is provided with a plurality of spaced openings 7 that are adapted to receive pin members 8. These pin members constitute rollers for a plurality of heart links 9, which are pivotally connected by pivot bolts 10 to a corresponding cross link 11. The heart links 9 are offset as shown in Fig. 1, but this constitutes no part of my invention, as any type of cam link or swing link may be employed.

A swing bolster 12 is secured to the cross links 11 and extends vertically therefrom between the side frames 6 of the vehicle. The shape of the bolster is such as to provide a pair of concave offset portions 13 which are adapted to receive complementary shaped seats 14 of a center pin 15. The center pin is pivotally mounted in a bushing 16 that is secured in a cross frame 17, which is fastened to the side frames 6 by suitable bolts 18.

The lower portion of the center pin is expanded and provided with notched extensions 19 for receiving a pair of oppositely located beams 20, which constitute part of the equalizer gear of the vehicle. The upper portion or constricted end of the center pin 15 is hollow and slotted to permit angular movement of the extended end 21 of the swing bolster 12, which is adapted to be swung angularly and transversely with respect to the longitudinal center line of the vehicle.

The upper end of the swing bolster is provided with a slotted opening 22, Fig. 2, which engages a screw-shaft 23 that is journaled in a box frame 24, which extends transversely of the side frames 6 and is suitably secured on the cross member 17. A pair of movable blocks or nuts 25 are mounted in screw-thread engagement on the shaft 23 and have bevelled faces 26 to provide clearance for the swing bolster when in the off-center position indicated by the dot-and-dash lines in Fig. 1. The end of the screw-shaft 23 is provided with a gear-wheel 27, which engages a pinion member 28 of an electric motor 29. The motor is fastened on the box frame 24 by suitable bolts 30.

In Fig. 4, the swing bolster construction is modified in a manner suitable for use with compression links 35 instead of the heart links 9. The compression links 35 are supported in grooves 36 that are provided in the truck frame 1. A horizontal bolster 37 and a vertical rocker arm 38 are provided as separate units, the rocker arm 38 being pivotally joined to the bolster 37, whereas, in Fig. 1, the arm and bolster constitute an integral member. The under side of bolster 37 is provided with two substantially V-shape grooves 39 for engaging the links 35, and the center pin 15 is supported on the rocker arm by means of the concave offset portions 13 of the latter and the complementary seating portion 14 of the center pin. A plurality of depending lugs 40 are provided on the bolster member to maintain the proper working alinement of the link members 35. The center-pin construction is the same as shown in Figs. 1 and 2 and the actuating mechanism for the swing bolster is the same as set forth in the foregoing description.

In Fig. 5 I have shown a diagrammatic view of a reversing controller for the main drive motors of the vehicle which controller is connected to the motor 29 for operating the blocks 25 of the screw mechanism. The controller 45 is provided with a reversing lever 46 and an operating lever 47. The upper portion 48 of the reversing drum comprises the standard reversing mechanism and the lower portion 49 comprises an auxiliary control, coupled with the upper control members, for operating the motor 29. The control mechanism for the motor 29 comprises a reversing switch 50 which is actuated by solenoids 51 that are electrically connected by circuits 52 to the auxiliary control 49, and a pair of limit switches 53 and 54 for cutting off the motor 29 after the blocks 25 have moved the requisite distance in either direction.

It is evident that such a control system provides a positive means for operating the actuating mechanism of the steering device for the guide trucks so that the operation of the motor 29 is positive with the direction of travel of the vehicle.

The operation of this device is briefly as follows: The truck structure is in the steering or leading position when the bolster 12 occupies the position shown in Fig. 1, that is, when the vertical center line of the bolster is coaxial with the center pin 15. The truck in this position is positively restrained and steers the vehicle relative to the contour of the rail.

To maintain the positive steering position of the bolster 12, it must be restricted to the vertical position. This is accomplished by moving the screw blocks 25 of the adjusting mechanism adjacent to the rocker arm or bolster portion that engages the sides of the screw-shaft 23. With the blocks in engagement with the bolster or rocker arm, the latter is restrained against transverse movement, thus maintaining a positive steering relation of the guide truck.

When the truck is on the trailing end of the vehicle, the blocks 25 are moved away from the bolster arm (as shown in Fig. 1) to provide free swinging movement of the bolster. The free swinging of the bolster offers zero restraint at the top of the rocker which permits it to take an inclined position on curves, so that it is restrained at its bottom support by the heart links 9 to produce positive steering when trailing.

The block members 25 move towards and away from each other, they having respectively left and right hand threads, and the screw-shaft 23 is similarly threaded, so that by moving the blocks 25 towards the center pin 15, the movement of the bolster 12 is positively restrained and by moving the blocks outwardly to the positions shown in Fig. 1, the bolster 12 is free to swing within the limits of the space between the blocks.

The adjusting mechanism for controlling the swinging movement of the bolster is independent of the steering mechanism of the truck and may comprise any suitable actuating means.

The motor-operated screw mechanism herein shown may be controlled in various ways, as by contact members located on the driving wheels of the vehicle to cause reversing of the motor for reverse movement of the vehicle, but I prefer to combine the motor switch with the control for the drive motors of the locomotive in order that, by manipulating the latter, the operator will simultaneously energize the motor to adjust the blocks 25 for the proper closed or spread position, in accordance with the direction of travel of the vehicle as shown in Fig. 5.

The steering effect on the vehicle reduces the flange wear on the wheels and the rails, and relieves the stresses on the vehicle frames, wheel centers, and axles to prevent breakage, which is otherwise of frequent occurrence on vehicles having long wheel bases and rigid trucks.

In the bolster construction shown in Fig. 4, the swing bolster functions in the same manner as the bolster of Fig. 1, and the steering action of the guide truck is practically the same with the compression links 35 as with the heart links 9 shown in Fig. 1. When the truck enters a curve, the thrust on the wheel flanges reacts against the weight on the bolster and causes a tilting of the link 35 on the frame of the guide truck about the one or the other of the pivot points of the link, depending on the direction of curvature of the rail, and the tilting of the link causes the rocker arm 38 to swing within the space defined by the position of the blocks 25, which are spread apart by the actuating mechanism or motor to permit free swinging motion for a positive trailing action.

The loading of the guide truck, Fig. 1, is effected through the beams 20 to the center-pin 15, which is supported at the joint 13—14 on the rocker arm 12. The latter is supported on the cross-links 11, which are carried by the heart-links 9 on the truck frame. In Fig. 4, the loading is similarly effected from the center-pin 15, which is supported on the rocker-arm 38, the swing bolster 37 and the compression links 35, the latter resting on the truck frame.

It is evident from the foregoing description of my invention that a guide truck made in accordance with the principles herein set forth provides an efficient and positive steering or guiding means for railway vehicles, greatly increasing the performance thereof and preventing damage otherwise resulting where the vehicle is forced against the resistance of the rails. Other advantages of this type of truck are its simplicity of design and its rugged construction, having all its operative parts accessible, which is essential for the proper lubrication and inspection of the working members.

Although I have described a specific embodiment of my invention, it will be obvious to those skilled in the art that various modifications may be made in the details of construction, the design and proportion of the several co-operating parts, and the application of the principle therein set forth without departing from the spirit of my invention.

I claim as my invention:—

1. In a railway vehicle, the combination with a guide truck, of steering means therefor, means for actuating said steering means and operating means for said vehicle for controlling said steering means.

2. In an electric railway vehicle, the combination with a guide truck, of a steering mechanism therefor, actuating means for said mechanism and means for controlling the operation of said vehicle and for automatically energizing said actuating means.

3. In an electric railway vehicle, the combination with operating mechanism for said vehicle and a guide truck, of a steering mechanism therefor, actuating means for said mechanism and means for automatically energizing said actuating means, said energizing means comprising an auxiliary control mechanism operatively connected to said operating mechanism.

4. In a railway vehicle, the combination with a guide truck, of steering means therefor, a motor-operated actuating device for said steering means and means for reversing said actuating device with the reversing of said vehicle.

5. In a railway vehicle the combination with a guide truck, of steering means therefor, a motor-operated actuating device for said steering means and means for automatically reversing said actuating device with the reversing of said vehicle.

6. In a railway vehicle, the combination with a guide truck, of motor-actuated means for effecting positive steering for said truck while in a leading position, and means for effecting positive steering thereof while in a trailing position, which automatically reverses when the drive motors are reversed.

7. In a railway vehicle, the combination with a guide truck of electrically operative means for effecting positive steering of the vehicle relative to the curvature of the rails when the truck is in a leading or a trailing position.

8. In a railway vehicle, the combination with a guide truck comprising a truck frame journalled on a wheel axle, of a swing bolster pivotally mounted on said frame, a centerpin pivotally mounted in the vehicle frame and supported on said bolster, said bolster extending vertically through said centerpin, means for providing lateral pivotal movement of said bolster, and means for limiting the movement thereof.

9. In a railway vehicle, the combination with a guide truck comprising a truck frame journalled on one or more wheel axles, of a plurality of cam links mounted on said frame, a swing bolster carried by said links and having a vertically projecting body portion extending between the side frames of the vehicle, a center-pin pivotally mounted in the vehicle frame and disposed around and supported by said bolster, means for permitting transverse movement of said bolster, and means for limiting such movement.

10. In a railway vehicle, the combination with a guide truck comprising a truck frame journalled on one or more wheel axles, of a plurality of cam links mounted on said frame, a swing bolster carried by said links and having a vertically projecting body portion extending between the side frames of the vehicle, of a centerpin pivotally mountd in the vehicle frame and disposed around and supported by said bolster, means for permitting transverse movement of said bolster and adjustable means for limiting such movement.

11. In a railway vehicle, the combination with a guide truck comprising a truck frame journalled on one or more wheel axles, of a plurality of cam links mounted on said frame, a swing bolster carried by said links and having a vertically projecting body portion extending between the side frames of the vehicle, a centerpin pivotally mounted in the vehicle frame and disposed around and supported by said bolster, means for permitting transverse movement of said bolster, and automatically adjustable means for limiting such movement.

12. In a railway vehicle, the combination with a guide truck comprising a truck frame journalled on one or more wheel axles, of a radius bar connecting said truck and vehicle frames, a swing bolster mounted on said truck frame and adapted to extend between parts of the vehicle frame, a centerpin mounted between said vehicle frame parts and having a pivotal movement transversely of said bolster, and adjustable restraining means for limiting such movement.

13. In a railway vehicle, the combination with a guide truck comprising a truck frame journalled on one or more wheel axles, of a radius bar connecting said truck and vehicle frames, a swing bolster mounted on said truck frame and adapted to extend between the vehicle side-frames, a centerpin mounted between the vehicle side-frames and having a pivotal connection with said bolster, means for permitting transverse movement of said bolster, and a screw-and-nut mechanism for limiting the transverse movement of said bolster.

14. In a railway vehicle, the combination with a guide truck comprising a truck frame journalled on one or more wheel axles, of a radius bar connecting said truck and vehicle frames, a swing bolster mounted on said truck frame and adapted to extend between the vehicle side-frames, a centerpin mounted between the vehicle side-frames and having a pivotal connection with said bolster, means for permitting transverse movement of said bolster, and a motor-driven screw-and-nut mechanism for limiting the transverse movement of said bolster.

15. In a railway vehicle, the combination with a guide truck comprising a truck frame journalled on one or more wheel axles, of a radius bar connecting said truck and vehicle frames, a swing bolster mounted on said truck frame and adapted to extend between the vehicle side-frames, a centerpin mounted between the vehicle side-frames and having a pivotal connection with said bolster, means for permitting transverse movement of said bolster, and a motor-driven mechanism for limiting the transverse movement of said bolster.

16. In a railway vehicle, the combination with a guide truck comprising a truck frame journalled on one or more wheel axles, of a radius bar connecting said truck and vehicle frames, a swing bolster mounted on said truck frame and adapted to extend between the vehicle side-frames, a centerpin mounted between the vehicle side-frames and having a pivotal connection with said bolster, and adjustable means independent of said bolster for permitting transverse movement thereof for one direction of movement of said vehicle.

17. In a railway vehicle, the combination with a guide truck comprising a truck frame journalled on one or more wheel axles, of a radius bar connecting said truck and vehicle frames, a swing bolster mounted on said truck frame and adapted to extend between the vehicle side-frames, a centerpin mounted between the vehicle side-frames and having a pivotal connection with said bolster, means for permitting transverse movement of said bolster for one direction of movement of said vehicle, and means for restricting such movement for the reverse direction of travel.

18. In a railway vehicle, the combination with a guide truck comprising a truck frame journalled on one or more wheel axles, of a radius bar connecting said truck and vehicle frames, a swing bolster mounted on said truck frame and adapted to extend between the vehicle side-frames, a centerpin mounted between the vehicle side-frames and having a pivotal connection with said bolster, a screw journalled in the vehicle frame, a pair of movable blocks in screw-thread engagement with said screw and adapted to engage said bolster, and actuating means for moving said blocks into and out of engagement with said bolster.

19. In a railway vehicle, the combination with a guide truck comprising a truck frame journalled on one or more wheel axles, of a radius bar connecting said truck and vehicle frames, a swing bolster mounted on said truck frame and adapted to extend between the vehicle side-frames, a centerpin mounted between the vehicle side-frames and having a pivotal connection with said bolster, a screw journalled in the vehicle frame, a pair of movable blocks in screw-thread engagement with said screw and adapted to engage said bolster, and an electric motor geared to said screw to effect lateral movement of said blocks into and out of engagement with said bolster.

In testimony whereof, I have hereunto subscribed my name this 6th day of June, 1924.

JOHN PAUL SHAMBERGER.